United States Patent [19]

Ferree et al.

[11] Patent Number: 4,576,778
[45] Date of Patent: Mar. 18, 1986

[54] CORE BARREL PLUG

[75] Inventors: Herbert E. Ferree, Hempfield Township, Westmoreland County; Thomas R. Wagner, Monroeville, both of Pa.

[73] Assignee: Westinghouse Electric Corp., Pittsburgh, Pa.

[21] Appl. No.: 523,995

[22] Filed: Aug. 17, 1983

[51] Int. Cl.$^4$ .................. G21C 13/06; F16L 55/12
[52] U.S. Cl. ........................ 376/203; 376/399; 376/400; 138/89; 277/27; 220/203; 220/232; 220/240; 220/315; 220/316
[58] Field of Search .............. 376/203, 204, 277, 283, 376/352, 399, 400, 377, 389, 390; 138/89; 277/27; 220/203, 232, 240, 315, 316

[56] References Cited

U.S. PATENT DOCUMENTS

| | | | |
|---|---|---|---|
| 3,124,158 | 3/1964 | Penfold | 220/316 |
| 3,156,373 | 11/1964 | Willis . | |
| 3,525,365 | 8/1970 | Meulendyk | 138/89 |
| 3,983,904 | 10/1976 | Laviano | 138/89 |
| 4,114,654 | 9/1978 | Richardson | 138/89 |
| 4,158,370 | 6/1979 | Larson | 138/89 |
| 4,312,708 | 1/1982 | Leslie | 376/203 |
| 4,335,757 | 6/1982 | Lankston | 138/89 |
| 4,390,042 | 6/1983 | Kucherer et al. | 138/89 |
| 4,436,117 | 3/1984 | Martin | 138/89 |

Primary Examiner—Charles T. Jordan
Assistant Examiner—Richard Klein
Attorney, Agent, or Firm—L. A. DePaul

[57] ABSTRACT

The invention comprises a core barrel plug capable of being remotely installed in a port of a core barrel of a pressurized water nuclear reactor for converting the reactor from a by-pass downflow configuration to a by-pass upflow configuration. The plug comprises a body having an expandable cylindrical portion with a movable mandrel disposed in the body. Remote fluid pressurization causes the mandrel to be advanced thus expanding the body into contact with the port. The plug also comprises a locking mechanism to prevent inadvertent release of the plug and a venting mechanism to prevent inadvertent overpressurization of the plug.

13 Claims, 6 Drawing Figures

CORE BARREL PLUG

BACKGROUND OF THE INVENTION

This invention relates to plugging devices and more particularly to plugs for altering the flow of coolant in a nuclear reactor.

Conventional pressurized water reactors comprise a reactor vessel with a reactive core disposed therein which produces heat in a manner well understood in the art. A water coolant is circulated through the reactor vessel and in heat transfer relationship with the core so that heat is transferred from the core to the water coolant. The reactive core generally comprises a plurality of fuel assemblies comprising nuclear fuel. The fuel assemblies are surrounded by a plurality of vertical metal baffle plates that define the outer limits of the core. Although the baffle plates are joined together to form an outer perimeter for the core, the individual baffle plates are not welded together. Since the baffle plates are not welded together, small gaps may exist between two adjacent baffle plates. Because the baffle plates serve to direct the flow of reactor coolant water through the reactor core, the small gaps between the baffle plates do not detract from the performance of this function. However, since a substantial pressure differential may exist across the baffle plates, it is possible for small streams of high velocity reactor coolant to be established through the gaps between these baffle plates. These streams of reactor coolant can cause vibrations in the fuel assemblies or otherwise damage the fuel assemblies.

One solution to this baffle jetting of coolant is disclosed in copending application Ser. No. 252,116, filed Apr. 8, 1981 in the name of E. P. Shields entitled "Baffle Maintenance Apparatus" and assigned to the Westinghouse Electric Corporation. In the copending application there is described apparatus for reducing the size of the gaps between the baffle plates to thereby reduce the jetting of coolant therethrough.

Another solution to the problem of baffle jetting is disclosed in copending application Ser. No. 466,464, filed Feb. 15, 1983 in the name of R. W. Tolino et al. entitled "Core Barrel Plug" and assigned to the Westinghouse Electric Corporation. In the Tolino et al. copending application there is described a core barrel plug capable of being remotely installed in a port of a core barrel of a pressurized water nuclear reactor for converting the reactor from a by-pass downflow configuration to a by-pass upflow configuration and thereby reducing the pressure differential across the baffle plates to reduce the baffle jetting problem. However, the Tolino et al. core barrel plug did not provide a means to automatically prevent overexpansion of the core barrel plug.

While there exists in the art methods and apparatus for reducing or eliminating the jetting of coolant through the gaps between baffle plates, what is needed is a device to alter the pressure differential across the baffle plates to eliminate or reduce the cause of the problem while preventing overexpansion of the apparatus.

SUMMARY OF THE INVENTION

The invention comprises a core barrel plug capable of being remotely installed in a port of a core barrel of a pressurized water nuclear reactor for converting the reactor from a by-pass downflow configuration to a by-pass upflow configuration. The plug comprises a body having an expandable cylindrical portion with a movable mandrel disposed in the body. Remote fluid pressurization causes the mandrel to be advanced thus expanding the body into contact with the port. The plug also comprises a locking mechanism to prevent inadvertent release of the plug and a venting mechanism to prevent inadvertent overpressurization of the plug.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

A substantial pressure differential may exist across the baffle plates in a nuclear reactor core which may result in small streams of high velocity reactor coolant being established through the gaps between the baffle plates which may result in damage to the reactor fuel in the core. The invention described herein provides a device for altering the direction of the flow of reactor coolant in a manner to reduce the pressure differential across the baffle plates thus minimizing or eliminating flow of high velocity reactor coolant through the gaps between the baffle plates.

Figure 1:
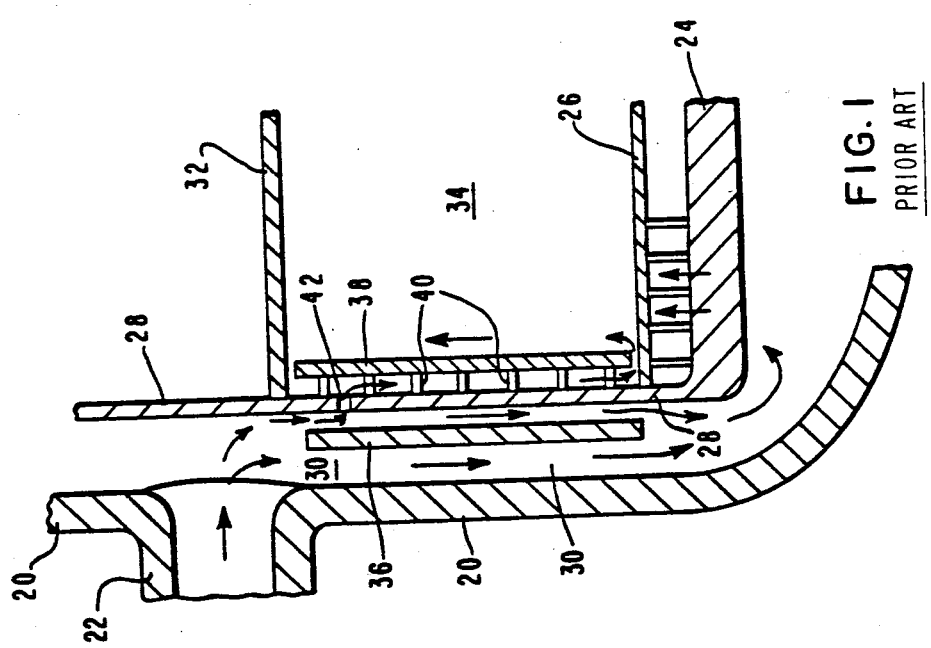
FIG. 1 is a cross-sectional view in elevation of a pressurized water nuclear reactor illustrating a downflow configuration.
Figure 3:
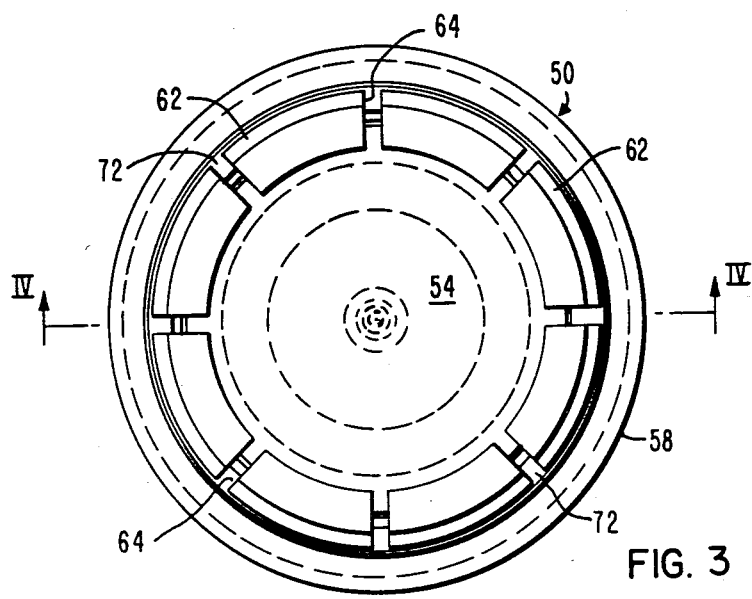
FIG. 3 is a front view of the plug.

Referring to FIG. 1, a typical pressurized water nuclear reactor comprises a reactor vessel 20 having an inlet 22 through which the reactor coolant, which may be water pressurized to about 2250 psi, enters reactor vessel 20. Reactor vessel 20 has a core support plate 24 disposed therein with a lower core plate 26 disposed above it. A substantially cylindrical core barrel 28 is disposed in reactor vessel 20 and is attached to core support plate 24 and lower core plate 26 while defining an annulus between core barrel 28 and reactor vessel 20 which is generally referred to as downcomer 30. An upper core plate 32 is attached to core barrel 28 above lower core plate 26 with the region between lower core plate 26 and upper core plate 32 defining the reactor core 34. Reactor core 34 may comprise nuclear fuel assemblies (not shown) chosen from those well known in the art.

A thermal shield 36 may be disposed between reactor vessel 20 and core barrel 28 and in downcomer 30 for thermally shielding reactor vessel 20 from the heat produced by core 34.

Still referring to FIG. 1, a series of substantially vertically arranged metal baffle plates 38 are disposed between core 34 and core barrel 28 for defining the outer edge of core 34. A series of formers 40 are horizontally attached to core barrel 28 and to baffle plates 38 for supporting baffle plates 38. Baffle plates 38 may generally be bolted together along their vertical edges but are not normally welded or otherwise sealed together. Core barrel 28 may also have several horizontal flow ports 42 which may number approximately 16 and may be spaced at approximately equal distances around the circumference of core barrel 28. Ports 42 extend through core barrel 28 and are located below upper core plate 32 for allowing the reactor coolant to flow from downcomer 30 through ports 42 and between core barrel 28 and baffle plates 38 for cooling core barrel 28 and baffle plates 38.

In a typical pressurized water nuclear reactor, the reactor coolant enters reactor vessel 20 through inlet 22 and flows downwardly through downcomer 30 and up through holes (not shown) in core support plate 24 and lower core plate 26. The reactor coolant proceeds upwardly through core 34 where heat is transferred from core 34 to the reactor coolant. The reactor coolant is then conducted out of reactor vessel 20 to the remainder of the steam supply system.

As can be seen from FIG. 1, a small amount of reactor coolant in downcomer 30 flows through ports 42 and into the space between core barrel 28 and baffle plates 38. This by pass flow then flows downwardly through holes (not shown) in formers 40 and around the bottom of baffle plates 38 near lower core plate 26 where the by-pass flow returns to the main coolant flow path. The purpose of the by-pass flow is to cool core barrel 28 and baffle plates 38. However, since the pressure of the by-pass flow is substantially higher than that of the coolant in the core region and since baffle plates 38 have small openings between them, small high velocity jets of coolant may be established that flow between baffle plates 38 and in the direction of core 34. These high velocity jets of coolant may cause damage to the nuclear fuel assemblies located near baffle plates 38 which may require that these jets of coolant be eliminated.

Figure 2:
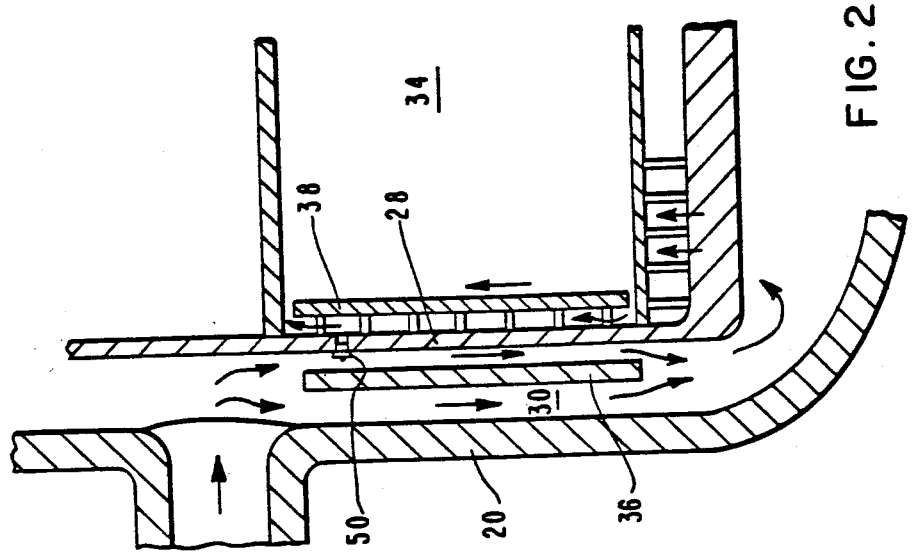
FIG. 2 is a cross-sectional view in elevation of a pressurized water nuclear reactor illustrating an upflow configuration.

Referring to FIG. 2, one method of eliminating these high velocity jets of coolant is to fill ports 42 with a plug 50, and to machine a hole in the uppermost former 40. With ports 42 filled by plugs 50, no coolant is allowed to flow through ports 42 which causes all of the in-coming coolant to flow downwardly through downcomer 30 and up through core support plate 24 and lower core plate 26. However, because ports 42 have been plugged, a small amount of by-pass flow will be established upwardly between core barrel 28 and baffle plates 38 for cooling core barrel 28 and baffle plates 38 as shown in FIG. 2. In this flow configuration, the pressure of the upward by-pass flow is substantially equal to the pressure of the coolant in core 34 so that no high velocity jets are established. Thus, by plugging ports 42 and machining holes in top former 40, the by-pass flow can be reversed from a downwardly flow to an upwardly flow thereby eliminating the jetting problem while providing the required cooling for core barrel 28 and baffle plates 28.

In order to accomplish this by-pass flow reversal, plug 50 must be manufactured to be compatible with the reactor internals and be capable of withstanding a steady state pressure differential of 70 psi and a transient pressure differential of approximately 900 psi. In addition, plug 50 must be capable of being remotely installed between thermal shield 36 and core barrel 28 where the distance therebetween is less than 2 inches and where the installation must take place under approximately 20 feet of water in a highly radioactive environment.

Figure 4:
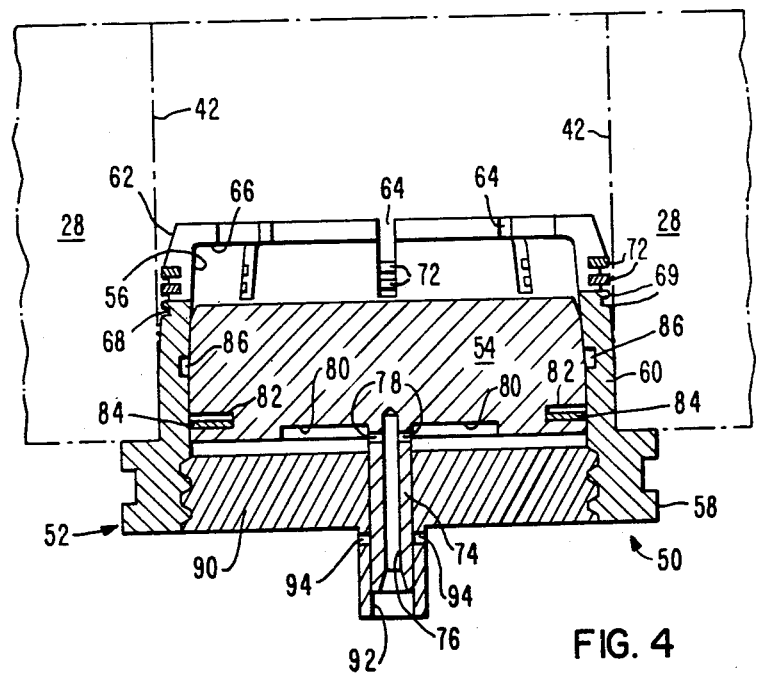
FIG. 4 is a view along line IV—IV of FIG. 3.

Referring now to FIGS. 3-6, plug 50 comprises a body 52 with a mandrel 54 slidably disposed in first bore 56 of body 52. Body 52 which may be manufactured from type 304 stainless steel may be approximately 4 inches in diameter and approximately 1.5 inches long. Body 52 may comprise a flange 58 and a substantially cylindrical portion 60. Flange 58 may be formed to have an outside diameter larger than the diameter of port 42 so that flange 58 may seat on the outside of port 42 as shown in FIG. 4. Flange 58 also has an inside diameter that defines first bore 56. Cylindrical portion 60 may be formed to have a leading tapered edge 62 for aiding the insertion of cylindrical portion 60 into port 42. The portion of first bore 56 defined by the inside diameter of cylindrical portion 60 is tapered so as to have a slightly smaller inside diameter near the leading edge of cylindrical portion 60. Cylindrical portion 60 also has a plurality of slots 64 therein which extend from the leading edge of cylindrical portion 60 and extend from the outside diameter to the inside diameter thereof. Slots 64 provide cylindrical portion 60 with sufficient flexibility and resiliency to enable expansion of cylindrical portion 60 under the action of mandrel 54. Cylindrical portion 60 is also formed with a lip 66 near its leading edge to hold mandrel 54 in body 52 and prevent overexpansion of cylindrical portion 60. In addition, cylindrical portion 60 has a first groove 68 therein that extends around the entire circumference thereof and located near the forwardmost section of cylindrical portion 60 but not in the section of cylindrical portion 60 that has slots 64 therein. First groove 68 provides further flexibility for cylindrical portion 60 and enhances the seal between cylindrical portion 60 and the inside surface of port 42 when cylindrical portion 60 is expanded. Raised ribs 69, on either side of first groove 68, are provided for being pressed against the inside surface of port 42 for enhancing sealing therebetween. Cylindrical portion 60 also has a set of second grooves 70 therein that extend around the entire circumference thereof which are located in the portion of cylindrical portion 60 that has slots 64. Each second groove 70 has a metal ring 72 disposed therein which may be made of age-harened stainless steel and are arranged to contact the inside surface of port 42 when cylindrical portion 60 is expanded thereby indenting into the inside surface of port 42 for holding plug 50 in place.

Still referring to FIGS. 3-6, mandrel 54 may be a substantially cylindrical member made of stainless steel and slidably disposed in cylindrical portion 60 of body 52. Mandrel 54 serves to expand cylindrical portion 60 into contact with the inside surface of port 42 when mandrel 54 is moved toward the leading edge of cylindrical portion 60.

Mandrel 54 may have a cylindrical extension 74 disposed in approximately the center of its back surface and extending therefrom. Extension 74 may have a channel 76 defined therein and extending to the outer surface of extension 74. Extension 74 may also have a plurality of passageways 78 connected from channel 76 to the outer surface of extension 74 near the body of mandrel 54. Channel 76 and passageways 78 provide a means by which a fluid such as water may be introduced into plug 50 for expanding plug 50. Mandrel 54 may also have a recessed portion 80 defined around extension 74 and in the back surface of mandrel 54 for providing a space into which the fluid may flow from passageways 78.

Mandrel 54 also has a first notch 82 therein near its back surface that extends around the entire circumference of mandrel 54 with a locking ring 84 disposed therein. Locking ring 84 may be a Spirolox retaining ring or similar type ring. Cylindrical portion 60 also has a second notch 86 on the inside surface thereof that extends around the entire inside circumference for accommodating the insertion of locking ring 84 when mandrel 54 is moved forward relative to cylindrical portion 60.

Plug 50 also comprises an end plug 90 disposed in the portion of first bore 56 defined by the inside diameter of flange 58. End plug 90 may be threaded or welded to flange 58. End plug 90 may have a cylindrical second bore 92 therein in which extension 74 is slidably disposed. End plug 90 also has a plurality of vents 94 which are connected between second bore 92 and the outside of end plug 90 for preventing overexpansion of plug 50 by venting the fluid in second bore 92.

Figure 5:
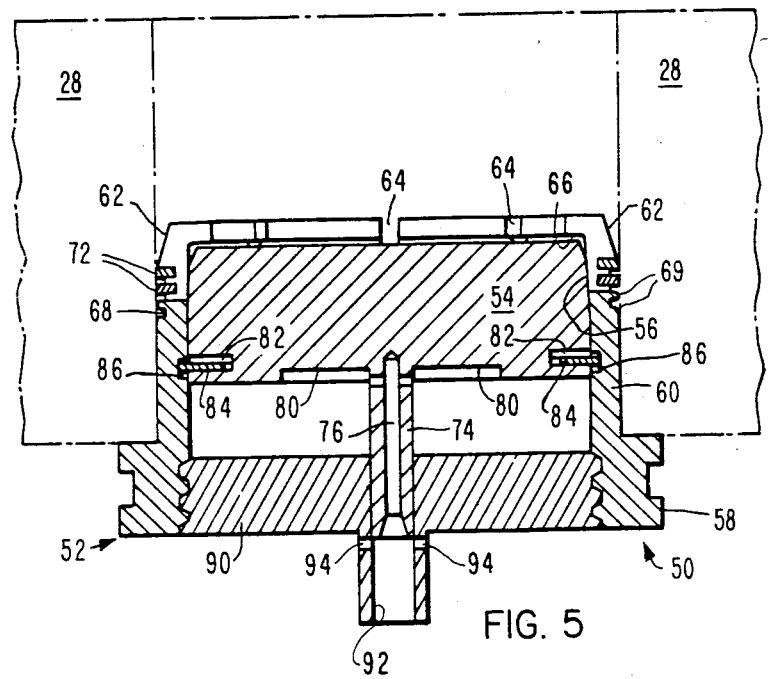
FIG. 5 is a view of the plug in the expanded position.
Figure 6:
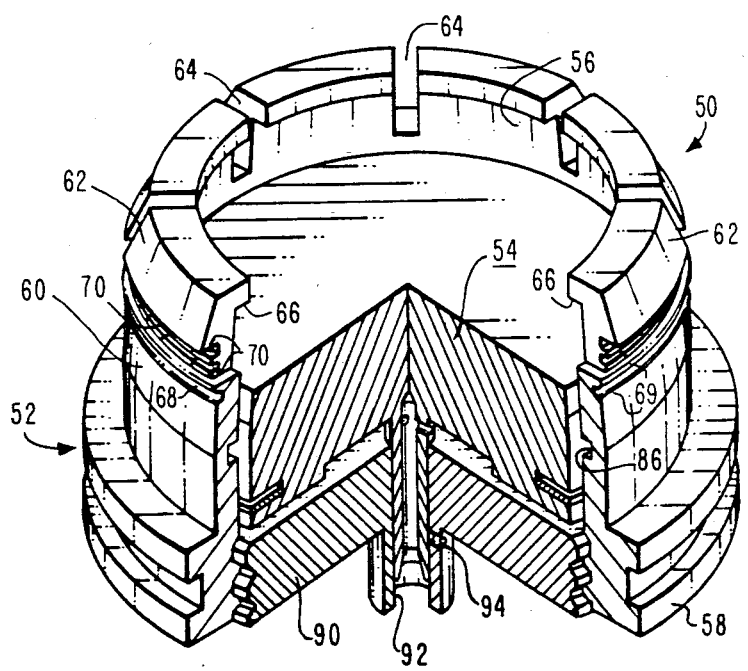
FIG. 6 is an isometric view of the plug.

When mandrel 54 is in the unexpanded position as shown in FIG. 4, a fluid such as water may be introduced into second bore 92, through channel 76 and passageways 78 for pressurizing the area between mandrel 54 and end plug 90 thereby moving mandrel 54 relative to cylindrical portion 60 as shown in FIG. 5. Mandrel 54 is moved forward in this manner until locking ring 84 is aligned with second notch 86. When locking ring 84 is aligned with second notch 86, locking ring 84 springs into second notch 86 thereby preventing further movement of mandrel 54 relative to cylindrical portion 60. At this point plug 50 is in a configuration as shown in FIG. 5. In this configuration, extension 74 has been moved relative to end plug 90 such that vents 94 are now in fluid communication with second bore 92 and channel 76. When in this position, vents 94 prevent further expansion or overpressurization of plug 50 by venting the pressurizing fluid to outside end plug 90. Thus, locking ring 84 and vents 94 provide a means by which plug 50 is prevented from being overexpanded and overpressurized while maintaining plug 50 in the locked position as shown in FIG. 5.

OPERATION

When it is desired to convert a pressurized water nuclear reactor from a downflow configuration as shown in FIG. 1 to an upflow configuration as shown in FIG. 2, the reactor is shut down and the reactor vessel head is removed to provide access to core barrel 28. Plug 50 is then remotely positioned by an appropriate installation tool so that cylindrical portion 60 of plug 50 is arranged to be inserted in port 42. In this position, the installation tool may have to be extended more than 20 feet under water in a highly radioactive environment in order to properly position plug 50.

Once plug 50 has been positioned near port 42, the installation tool may be used to insert cylindrical portion 60 into port 42. With cylindrical portion 60 inserted in port 42, fluid may be introduced through a fluid conduit and through channel 76 at a pressure of between approximately 3,000–6,000 psi. The fluid causes mandrel 54 to move from a position as shown in FIG. 4 to a position as shown in FIG. 5 by moving mandrel 54 toward the leading edge of plug 50. As mandrel 54 is moved, it causes cylindrical portion 60 to expand into contact with the inside surface of port 42. At the same time, rings 72 and ribs 69 firmly contact the inside surface of port 42 thereby preventing flow of reactor coolant through port 42. As mandrel 54 is advanced, locking ring 84 is inserted in second notch 86 which locks mandrel 54 in the expanded position while vents 94 prevents overpressurization of the plug 50.

Therefore, the invention provides a core barrel plug for plugging holes in the core barrel and preventing flow of reactor coolant therethrough.

We claim:

1. A nuclear reactor having a core barrel and a plug for preventing flow through a port in said core barrel, said plug comprising:

a substantially cylindrical body formed with a cylindrical portion and a flange and defining a tapered leading open end, said body defining a bore therein extending from said open end to said flange with said bore having a smaller diameter near said open end than near said flange, said cylindrical portion being formed with a plurality of longitudinal slots extending from said open end toward said flange and extending entirely through its thickness;

an end plug attached to said flange and having a second bore therethrough and holes therein extending from said second bore to the outside of said end plug;

a mandrel slidably disposed and captured in said body and having an extension slidably disposed through said second bore with said extension having a channel therethrough for allowing a fluid to pass through said channel and into a space defined between said mandrel and said end plug for moving said mandrel toward said open end of said body when said fluid is introduced into said space thereby causing said cylindrical portion to be expanded, said extension allowing said fluid to pass into said holes when said mandrel is in the expanded and locked position thereby venting said fluid and preventing overexpansion of said plug; and locking means disposed on said mandrel for locking said mandrel in the expanded position.

2. The plug according to claim 1 wherein said locking means comprises:

a first notch disposed in said mandrel and extending around the outside circumference thereof;

a second notch disposed in said cylindrical portion and extending around the inside circumference thereof; and a locking ring disposed in said first notch and capable of being inserted in said second notch when said mandrel is moved toward said open end.

3. The plug according to claim 2 wherein said cylindrical portion has a lip near said open end for containing said mandrel in said body.

4. The plug according to claim 3 wherein said cylindrical portion has a plurality of grooves on the outside circumference thereof for establishing a seal when said cylindrical portion is expanded.

5. The plug according to claim 4 wherein said grooves comprise a first groove located near the forwardmost portion of said cylindrical portion but not in the section of said cylindrical portion that has said slots therein.

6. The plug according to claim 5 wherein said grooves further comprise a plurality of second grooves located in the section of said cylindrical portion that has said slots therein.

7. The plug according to claim 6 wherein said plug further comprises metal rings disposed in said second grooves.

8. A plug for preventing flow through a port in a core barrel of a pressurized water nuclear reactor comprising:
- a substantially cylindrical body formed with a cylindrical portion and a flange and defining a tapered leading open end, said body defining a bore therein extending from said open end to said flange with said bore having a smaller diameter near said open end than near said flange, said cylindrical portion being formed with a plurality of longitudinal slots extending from said open end toward said flange and extending entirely through its thickness;
- an end plug attached to said flange and having a second bore therethrough and holes therein extending from said second bore to the outside of said end plug;
- a mandrel slidably disposed and captured in said body and having an extension slidably disposed through said second bore with said extension having a channel therethrough for allowing a fluid to pass through said channel and into a space defined between said mandrel and said end plug for moving said mandrel toward said open end of said body when said fluid is introduced into said space thereby causing said cylindrical portion to be expanded, said extension allowing said fluid to pass into said holes when said mandrel is in the expanded and locked position thereby venting said fluid and preventing overexpansion of said plug;
- a first notch disposed in said mandrel and extending around the outside circumference thereof;
- a second notch disposed in said cylindrical portion and extending around the inside circumference thereof; and
- a locking ring disposed in said first notch and capable of being inserted in said second notch when said mandrel is moved toward said open end for locking said mandrel in the expanded position.

9. The plug according to claim 8 wherein said cylindrical portion has a lip near said open end for containing said mandrel in said body.

10. The plug according to claim 9 wherein said cylindrical portion has a plurality of grooves on the outside circumference thereof for establishing a seal when said cylindrical portion is expanded.

11. The plug according to claim 10 wherein said grooves comprise a first groove located near the forwardmost portion of said cylindrical portion but not in the section of said cylindrical portion that has said slots therein.

12. The plug according to claim 11 wherein said grooves further comprise a plurality of second grooves located in the section of said cylindrical portion that has said slots therein.

13. The plug according to claim 12 wherein said plug further comprises metal rings disposed in said second grooves.

* * * * *